(12) United States Patent
Auchmoody et al.

(10) Patent No.: US 8,386,521 B2
(45) Date of Patent: Feb. 26, 2013

(54) SYSTEM FOR BACKING UP AND RESTORING DATA

(75) Inventors: Scott C. Auchmoody, Irvine, CA (US); Eric W. Olsen, Lake Forest, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/460,285

(22) Filed: Apr. 30, 2012

(65) Prior Publication Data
US 2012/0215746 A1    Aug. 23, 2012

Related U.S. Application Data

(60) Division of application No. 12/850,239, filed on Aug. 4, 2010, now Pat. No. 8,185,554, which is a continuation of application No. 11/968,053, filed on Dec. 31, 2007, now Pat. No. 7,788,220.

(51) Int. Cl.
*G06F 17/30* (2006.01)

(52) U.S. Cl. ........ 707/791; 707/706; 707/736; 707/758; 707/781; 707/802

(58) Field of Classification Search ........... 707/600–899
See application file for complete search history.

(56) References Cited

U.S. PATENT DOCUMENTS 7,395,284 B2    7/2008  Sato et al.
2008/0172532 A1*  7/2008  Chavan et al. ................ 711/148

* cited by examiner

*Primary Examiner* — Isaac M Woo
(74) *Attorney, Agent, or Firm* — Workman Nydegger

(57) ABSTRACT

In one example, a system that is operable to back up and restore data may include a high efficiency storage application configured to back up a chunk of data of a client system to a content addressed storage system by generating a recipe that includes instructions for generating the chunk of data from a plurality of data pieces. The system may further include a backup server communicably connected to the high efficiency storage application and configured to, among other things, in response to receipt of a restore request, recover the chunk of data by retrieving the recipe and appended storage addresses in one index seek without separately looking up a storage address for any of the plurality of data pieces in an index.

13 Claims, 9 Drawing Sheets

SYSTEM FOR BACKING UP AND RESTORING DATA

CROSS-REFERENCE TO RELATED APPLICATIONS

This application is a division, and claims the benefit, of U.S. patent application Ser. No. 12/850,239, entitled STORAGE OF DATA WITH COMPOSITE HASHES IN BACKUP SYSTEMS, filed Aug. 4, 2010, which is a continuation of U.S. patent application Ser. No. 11/968,053 (issued as U.S. Pat. No. 7,788,220), entitled STORAGE OF DATA WITH COMPOSITE HASHES IN BACKUP SYSTEMS, filed Dec. 31, 2007. All of the aforementioned applications are incorporated herein in their entireties by this reference.

BACKGROUND OF THE INVENTION

1. The Field of the Invention

The present invention relates to data storage and backup solutions for archiving data. More particularly, embodiments of the invention relate to hardware, software, systems, and methods for efficiently backing up and/or restoring data by localizing storage of data referenced in a composite or directory element with the composite or directory element in a hash file system and content addressed storage.

2. The Relevant Technology

The need for reliable backup and archiving of information is well known. Businesses are devoting large amounts of time and money toward information system (IS) resources that are devoted to providing backup and archive of information resident in computers and servers within their organizations that produce and rely upon digital information. The customers of the data storage industry are more frequently demanding that not only is their data properly backed up but also that such data protection be done in a cost effective manner with a reduced cost per bit for stored data sets.

To address these demands, Content Addressed Storage (CAS) has been developed to provide a more cost effective approach to data backup and archiving. Generally, CAS applications involve a storage technique for content that is in its final form, i.e., fixed content, or that is not changed frequently. CAS assigns an identifier to the data so that it can be accessed no matter where it is located. For example, a hash value may be assigned to each portion or subset of a data set that is to be data protected or backed up. Presently, CAS applications are provided in distributed or networked storage systems designed for CAS, and storage applications use CAS programming interface (API) or the like to store and locate CAS-based files in the distributed system or network.

The usage of CAS enables data protection systems to store, online, multi-year archives of backup data by removing storage of redundant data because complete copies of data sets do not have to be stored as long as that content is stored and available. The use of CAS removes the challenges of maintaining a centralized backup index and also provides a high level of data integrity. CAS-based backup and archive applications have also improved the usage network and data storage resources with better distribution of data throughout a multi-node data storage system.

CAS-based backup and archive applications are also desirable because multi-year or other large backup archives can be stored easily since only a single instance of any particular data object (i.e., content) is stored regardless of how many times the object or content is discovered with the data set being protected or backed up. With CAS, the storage address for any data element or content is generated by an analysis of the contents of the data set itself. Since an exclusive storage address is generated for each unique data element (which is matched with a unique identifier) and the storage address points to the location for the data element, CAS-based architectures have found favor in the storage industry because they reduce the volume of data stored as each unique data object is stored only once within the data storage system.

In a CAS-based architecture, directories, files, and other large sequences of digital data are broken down into multiple unique data elements. In this way, when a small modification is made to a large digital sequence, only a few (as few as one) affected data elements of the large digital sequence have to be added to the CAS system, rather than adding the entire modified large digital sequence to the CAS system. In order to reconstruct each of the large sequences of digital data from multiple individual data elements, a CAS system creates and stores recipes (such as composites or directory elements), each recipe referencing two or more corresponding data elements making up the larger digital sequence and including instructions for combining the data elements.

In a conventional CAS system, storage addresses generated for a recipe and for the unique data elements referenced by the recipe may exist on different storage nodes. As a result, restoring a corresponding large sequence of digital data can require performing multiple seeks across numerous storage nodes to retrieve each of the unique data elements. These multiple seeks, in turn, affect the performance of the CAS system, as each seek increases the total time required to complete a restore process.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
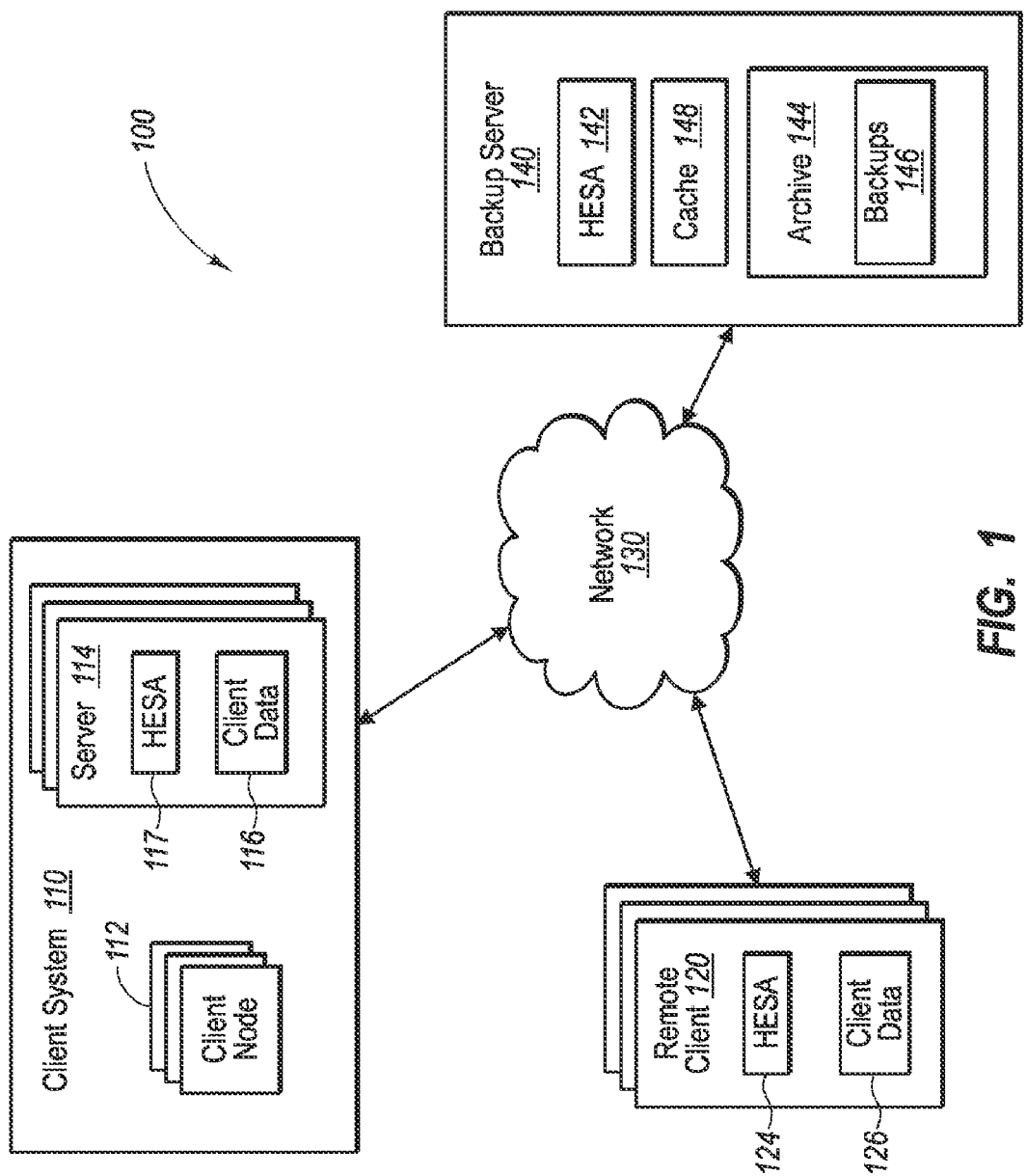
FIG. 1 illustrates an example operating environment in which embodiments of the invention can be implemented.

Embodiments of the invention relate to methods and systems for speeding up backup and restore operations performed by a hash file system ("HFS")/backup server and content addressed storage ("CAS") system by reducing required seek operations. In a typical embodiment, data entered into the CAS system is assigned a probabilistically unique identifier (such as a hash) based on the contents of the data. The identifier is steered to an index stripe on a storage node of the CAS system where it is stored. The index stripe also records a specific storage address (on a data stripe of the same or a different storage node) of the corresponding data. In this manner, the data can be retrieved by using the identifier to lookup the specific storage address in the corresponding index stripe and then retrieving the data from the storage address of the corresponding data stripe.

Data entered into the CAS system as described may be of three basic types: (1) atomic data, also referred to as chunks or blocks of data, (2) composite data, or recipes for constructing larger chunks of data that includes probabilistically unique identifiers pointing to atomic data and/or other composite data with instructions of how to combine the atomic and/or other composite data, and (3) directory element data for every backed up file, which includes metadata, filename, modify times, sizes, attributes, ACLs, and one or more probabilistically unique identifiers pointing to the contents of the file (in other words, directory element data also includes recipes for constructing larger chunks of data (e.g., files) from atomics and/or composites).

As explained, the CAS system stores data based on its content, thereby preventing the redundant storage of data. This enables one or more clients of the HFS server to generate de-duplicated backup data sets. A client generates a de-duplicated backup data set by assigning probabilistically unique identifiers to data within the backup data set based on content and compares them to probabilistically unique identifiers corresponding to data already entered into the CAS system. For data that has already been stored in the CAS system, the client provides the probabilistically unique identifiers to the HFS server without providing the corresponding data. For data not already stored in the CAS system, the client provides the probabilistically unique identifiers and the corresponding data to the HFS server.

To avoid data corruption, the HFS server verifies the existence of data making up composites or directory elements before entering composites or directory elements into a backup data set stored in the CAS system. Typically, this includes looking up the probabilistically unique identifiers referenced in the composite or directory element in the appropriate index stripe(s) to identify corresponding storage addresses. To reduce seek operations performed later during restore, the HFS server stores the corresponding storage addresses with the composites or directory elements. Consequently, the storage address of each piece of data pointed to by probabilistically unique identifiers referenced in a composite or directory element can be retrieved when the composite or directory element is retrieved.

To further reduce seek operations during both backup and restore processes, the HFS server can store data localized by a corresponding composite or directory element. For instance, when entering a new composite or directory element into the CAS system, the probabilistically unique identifier derived from the composite or directory element is steered to an index stripe on a first storage node where the new composite or directory element is stored. The composite or directory element includes probabilistically unique identifiers corresponding to data that may or may not be currently stored in the CAS system. For new data not currently stored in the CAS system, the corresponding probabilistically unique identifiers are steered to index stripes on storage nodes that may be different from the first storage node. However, the new data is stored contiguously on the first storage node near the composite or directory element, rather than on the same storage nodes as the corresponding probabilistically unique identifiers.

Later during a restore operation, the HFS server retrieves a composite or directory element. Since the storage addresses for data pointed to by probabilistically unique identifiers are stored with the composite or directory element, the HFS server does not have to do a seek operation on the corresponding index stripes to identify corresponding storage addresses. Thus, a cache used by the HFS server to generate a restore data set can be immediately populated with probabilistically unique identifiers and storage addresses of data pointed to by the probabilistically unique identifiers once a composite or directory element has been retrieved.

Additionally, multiple data stored localized by a corresponding composite or directory element can be retrieved in one seek once the cache has been populated with storage addresses. In particular, the storage addresses for the localized data may be recognized as contiguous addresses such that the HFS server can retrieve localized data all at once without doing a seek on each address individually. Advantageously, this can significantly reduce the number of seek operations performed during a restore process. Additionally, the localized storage of data near a corresponding composite or directory element can reduce the number of seeks performed during a backup process.

To practice the invention, the client, backup server, and storage may be any devices useful for providing the described functions, including data processing and storage and communication devices and systems such as computer devices typically used as hosts in user systems with processing, memory, and input/output components, and server devices configured to maintain and then transmit digital data over a communications network. Data typically is communicated in digital format following standard communication and transfer protocols. The data storage resources are generally described as disk, optical, and tape devices that implement RAID and other storage techniques and that may use SCSI and other I/O, data transfer, and storage protocols, but the invention is not intended to be limited to the example embodiments or to specific hardware and storage mechanisms as it is useful for nearly any data storage arrangement in which backups of digital data are generated and maintained.

With reference now to FIG. 1, a data storage (or data protection) system 100 is illustrated which implements aspects of the invention. The system 100 is shown in simplified or example form and is intended to represent a distributed network of computer systems/devices that generate digital data that is protected with copies stored in an archive or backup file system (such as a disk, tape, or other archival solution). The backup or data protection is managed by a backup server 140 that may be provided remotely as shown and/or be provided all or in part as part of a client system (e.g., client systems 110, 120 may include an instance of a storage application). The backup server 140 may also be referred to as a data storage management system, hash file system ("HFS") server, or content addressed storage ("CAS") server.

As shown, the system 100 includes a client system or network 110 such as a data center that includes a plurality of client nodes 112 such as desktops, laptops, or the like that are networked to one or more servers (or other memory devices) 114. Client data 116 generated and/or accessed by the client nodes 112 can additionally be stored on the servers 114 to allow ready access.

One or more remote clients 120 can link to the client system 110 and/or to the data storage management system 140 via communications network 130 (e.g., a LAN, a WAN, the Internet, or other wired and/or wireless digital communications networks). In addition, the remote client 120 may store client data 126 generated and/or accessed by the remote client 120.

In the embodiment of FIG. 1, the client data 116, 126 is managed for data protection by a high efficiency storage application 117, 124 on each of the client systems 110, 120. Generally, such data protection involves the high efficiency storage applications 117, 124 generating backups for storage in the archive 144. The archive 144 may take many forms such as content addressed storage ("CAS"), disk storage, holographic systems, tape storage, other memory mechanisms, and combinations of such mechanisms that are useful for archiving large amounts of digital information. Further, the archive 144 may be integrated with the HFS server 140 as shown and/or may be in a remote location. In the present embodiment, the archive 144 comprises a CAS archive.

In one embodiment of the invention, the storage applications 117, 124 are high efficiency storage applications that control the size of the generated backups 146 such as by storing limited copies of data objects or atomics and/or changes to stored content. For example, the applications 117, 124 may be CAS or HFS applications. Various embodiments of example CAS/HFS systems and related methods are disclosed in U.S. Pat. No. 6,704,730 (the '730 patent) and U.S. Pat. No. 6,810,398 (the '398 patent), both of which are incorporated by reference in their entirety.

Alternately or additionally, the backups generated at each of the client systems 110, 120 may be transmitted to the backup server 140 prior to being data de-duplicated. In this case, the backup server 140 may include a high efficiency storage application 142, similar to the storage applications 117, 124 described above, for de-duplicating the backups 146 prior to their storage in the archive 144. Alternately or additionally, the storage applications 117, 124, 142 may be used to restore data. In one embodiment, the backup server 140 includes a cache 148 for use in restore operations.

Typically, each of the backups 146 represents a secondary copy of the production client data 116, 126 as of a particular point in time. For instance, each storage application 117, 124 may generate backups at different times, such as hourly, daily, weekly, and the like or any combination thereof. Additionally, the size of a backup can be minimized, thereby conserving network resources, by including only new/changed data in the backup.

The HFS server 140 receives and stores backups generated at each of the client systems 110, 120 in the archive 144. The HFS server 140 implements a hash file system to store and retrieve data from the CAS archive 144. As previously described, backup data stored in the CAS archive 144 may be of three basic types: (1) atomic data, (2) composite data, and (3) directory element data. Both composite data and directory element data include recipes for generating larger chunks of data from atomic data and/or other composite data. Although not illustrated, the backup server 140 may further include a user accounting system which allows symbolic lookup of root hashes for file systems stored in the CAS archive 144.

Figure 2:
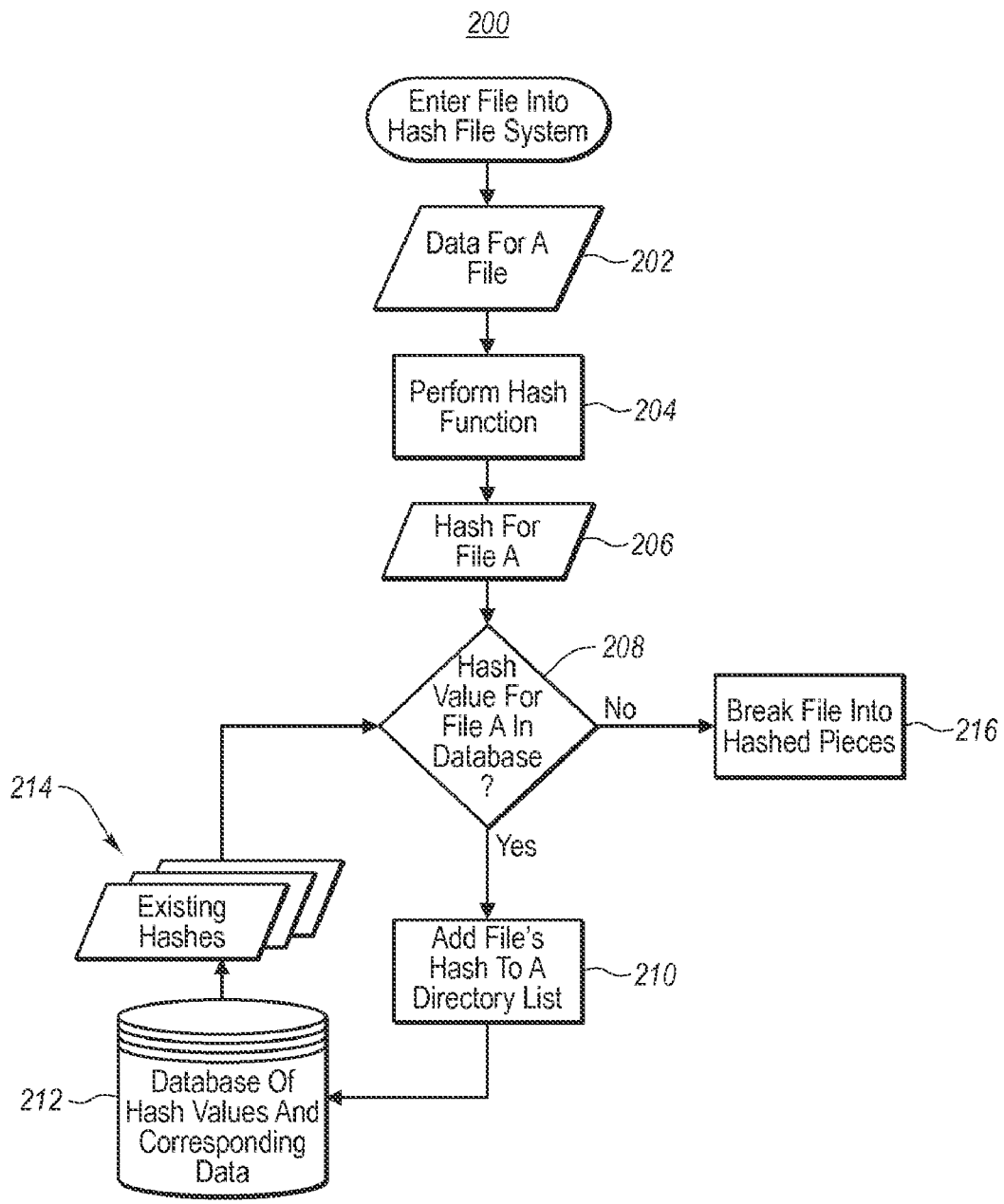
FIG. 2 is a logic flow chart depicting steps in the entry of a computer file into a hash file system.

With reference additionally now to FIG. 2, a logic flow chart is shown depicting the process of entry of a computer file 202 into the CAS archive 144. The computer file 202 may be generated by a user on a client node or on a remote client, for example, and may correspond to the client data 116 or 126. Any digital sequence could also be entered into the archive 144 of the HFS server 140 in the present embodiment in much the same way, but the current example wherein the digital sequence entered consists of a computer file is instructive.

The process 200 begins by performing 204 a hash function on File A 202 and the resulting hash value (also referred to as a "hash" or "content hash") 206 of File A is compared 208 to the contents of a database 212 containing hash file values. In one embodiment, the database 212 corresponds to the backup server 140 and/or archive 144 of FIG. 1. If the hash value 206 of File A is already in the database, then the file's hash value is added 210 to a directory list or hash recipe. This hash recipe includes, in one embodiment, the data and associated structures needed to reconstruct a file, directory, volume, or entire system depending on the class of computer file data entered into the system. The contents of the database 212 comprising hash values and corresponding data is provided in the form of existing hash values 214 for the comparison operation of decision step 208.

Figure 3:
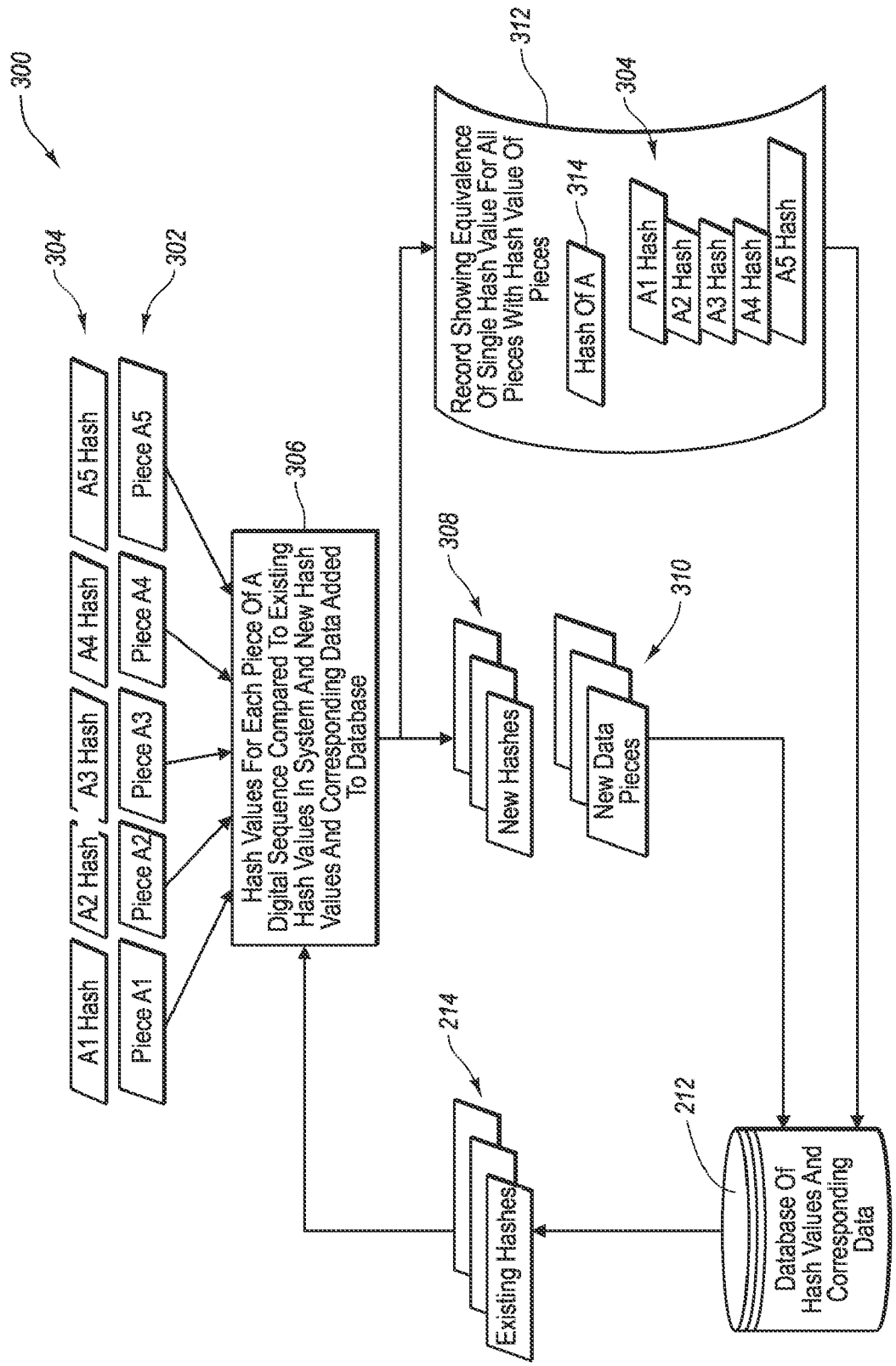
FIG. 3 is a further logic flow chart depicting steps in the entry of individual pieces of a computer file into a hash file system.

On the other hand, if the hash value 206 for File A is not currently in the database, at step 216 the file is broken into pieces 302 and each piece is hashed to generate hash values 304, illustrated in FIG. 3. In one embodiment, File A is divided into variably-sized pieces based on commonality with other pieces in the system or the likelihood of pieces being found to be in common in the future according to the sticky byte algorithm described in the '730 and '398 patents. Alternately or additionally, File A may be divided into pieces using other algorithms that generate pieces of variable or fixed sizes.

FIG. 3 further depicts a comparison process 300 for the hash values 304 of each piece 302 of the File A to those of existing hash values 214 maintained in the database 212 of FIG. 2. Particularly, the hash values 304 for each piece 302 of the file are compared 306 to existing hash values 214 and new hash values 308 and corresponding new data pieces 310 are added to the set 212. In this way, hash values 308 not previously present in the database set 212 are added together with their associated data pieces 310. The process 300 also results in the production of records 312 (also referred to as recipes) showing the equivalence of a single hash value 314 for all file pieces with the hash values 304 of the various pieces 302. New/modified recipes 312 and hash values 314 derived from the new/modified recipes are also added to the set 212.

Various hashing algorithms can be implemented by the storage applications 117, 124 to obtain hash values of files, composites, atomics, and the like, including SHA1, MD5, and the like or any combination thereof. In one embodiment, the hashing algorithm implemented produces deterministic and probabilistically unique identifiers. The identifiers are deterministic in the sense that given an input, the output identifier will always be the same and probabilistically unique in the sense that the chance of hash collisions is small. While the probabilistically unique identifiers may be hash values, other probabilistically unique or actually unique identifiers can be used by adapting the methods described herein.

Figure 4:
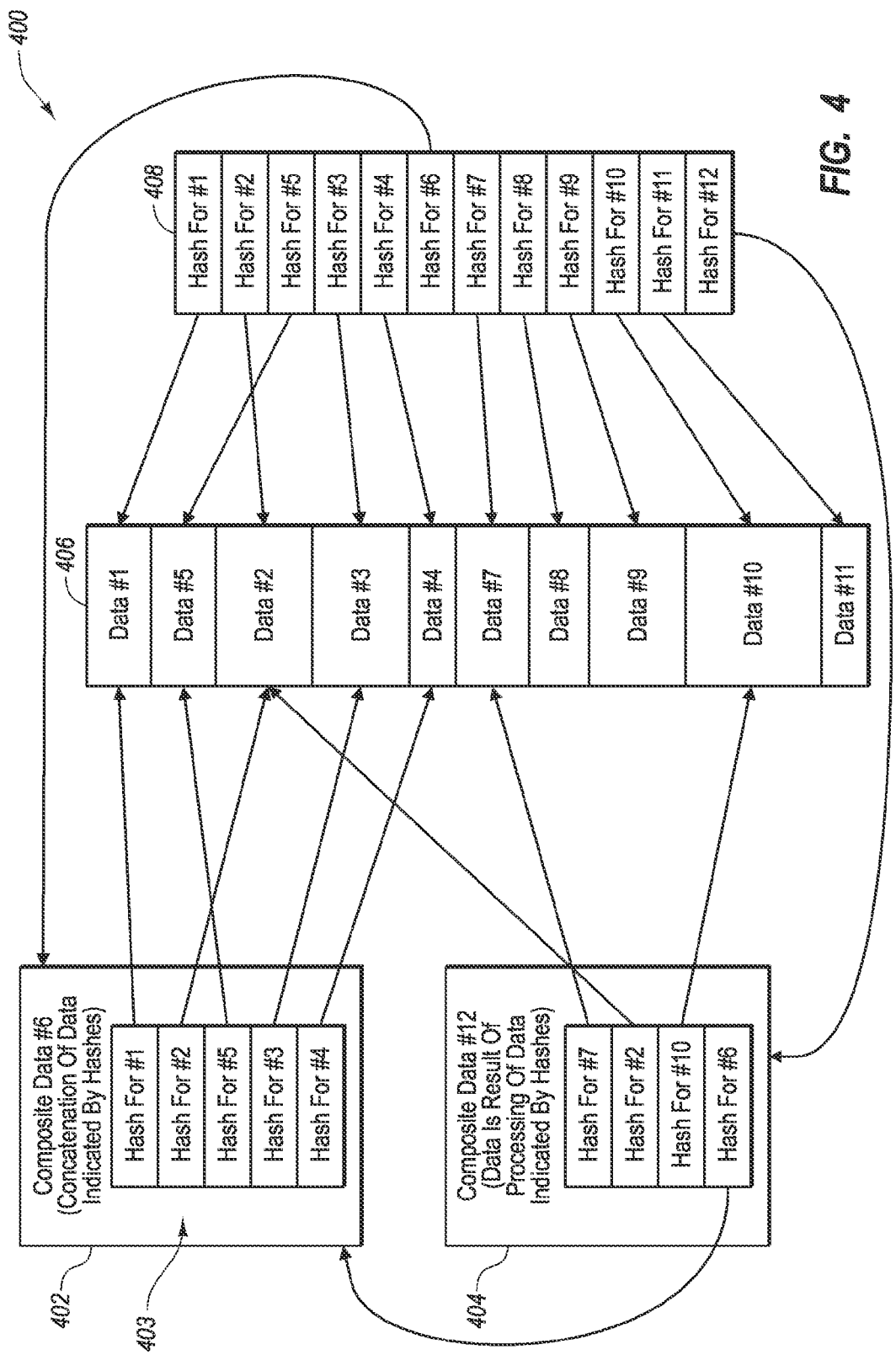
FIG. 4 is a conceptual representation of composite data that may include a recipe for the concatenation of data atomics or other composite data in a hash file system.

With reference additionally now to FIG. 4, a conceptual representation 400 is shown illustrative of the fact that composite data (such as composite data 402 and 404) derived by means of the system and method of the present invention is effectively the same as the data 406 represented explicitly but is instead created by a "recipe" or formula. Each recipe may include the concatenation of data represented by one or more hashes (selected from the hashes 408) within the recipe and/or the result of a function using the data represented by the hashes. For example, the recipe for composite data 402 includes the concatenation of data represented by hash values 403. The data blocks or atomics 406 may be variable length blocks as shown and the hash values 408 are derived from their associated data blocks. Note that composite data can reference other composite data. As one example, composite data 404 references composite data 402. Further, the hash values for the composite data 402, 404 can be derived from the value of the data the recipe creates or the hash value of the recipe itself.

Figure 5:
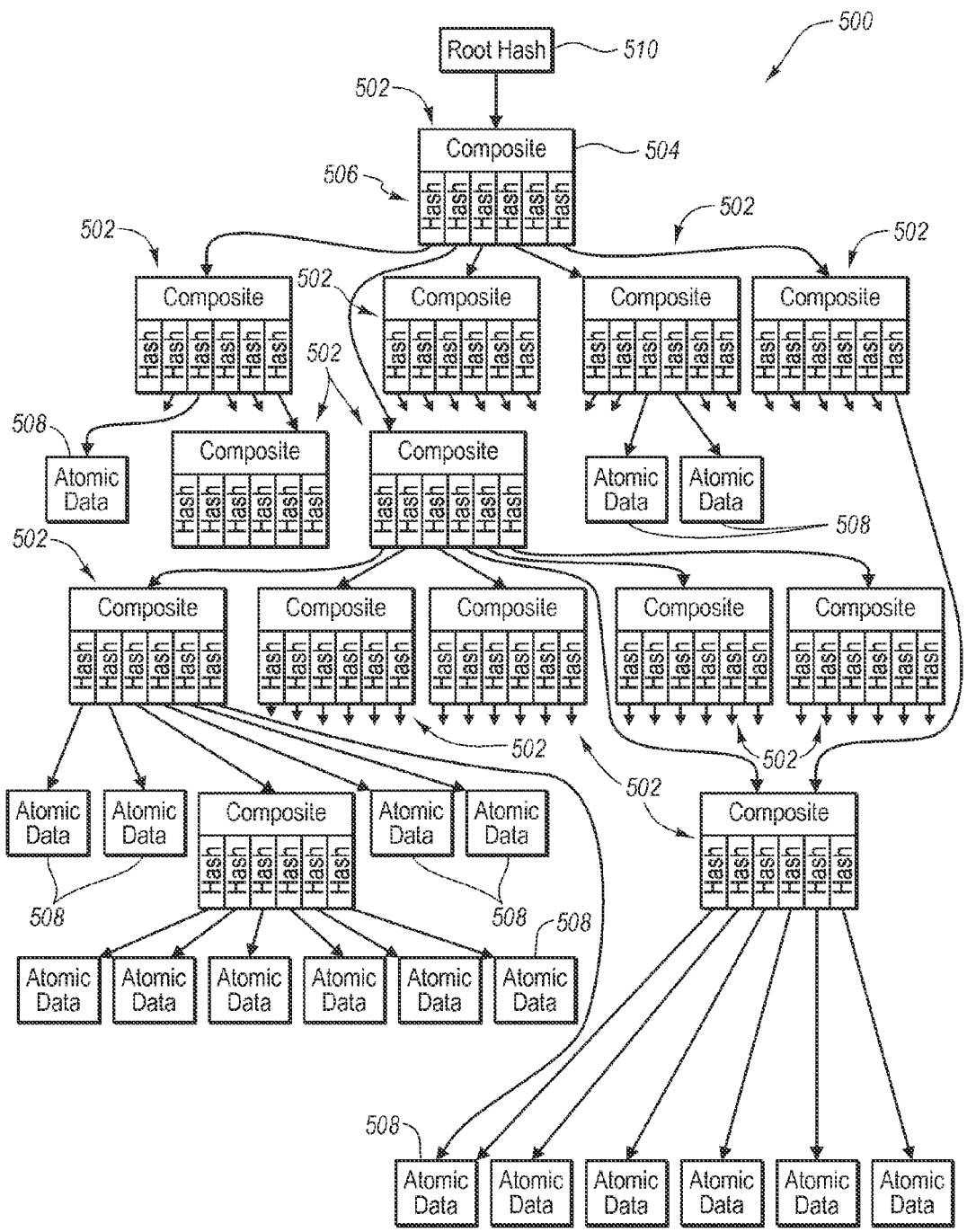
FIG. 5 depicts a conceptual representation of how a hash file system can be utilized to organize data.

With reference additionally now to FIG. 5, another conceptual representation 500 is shown of how the hash file system and method of the invention may be utilized to organize data 502 to optimize the reutilization of redundant sequences through the use of hash values 506 as pointers to the data they represent and wherein data 502 may be represented either as explicit byte sequences (atomic data) 508 or as groups of sequences (composites) 504.

The representation 500 illustrates the tremendous commonality of recipes and data that gets reused at every level. The basic structure of the hash file system of the present embodiment is essentially that of a "tree" or "bush" wherein the hash values 506 are used instead of conventional pointers. The hash values 506 are used in the recipes (e.g., composites or directory elements) to point to the data or another hash value that could also itself be a recipe. In essence, then, recipes can point to other recipes that point to still other recipes that ultimately point to some specific data (e.g., atomic data), eventually getting down to nothing but atomic data.

At the topmost level of the tree 500 of FIG. 5, a hash can be performed to generate a root hash 510. Because the hashes performed at each level of the tree result in the production of probabilistically unique hash values for each corresponding data atomic, composite, or directory element upon which the hash is performed, the existence of the root hash 510 in the database 212 (e.g., on the backup server 140) implicates the existence of all the data beneath the root hash somewhere on the backup server. In other words, if the root hash 510 exists in the database 212 (e.g., as one of the existing hashes 214), then all of the data referenced at any level within the tree of the root hash 510 exists somewhere on the system 140 and can be restored by beginning with the root hash and retrieving the directory element, composite, and atomic data at every level beneath the root hash.

Figure 6:
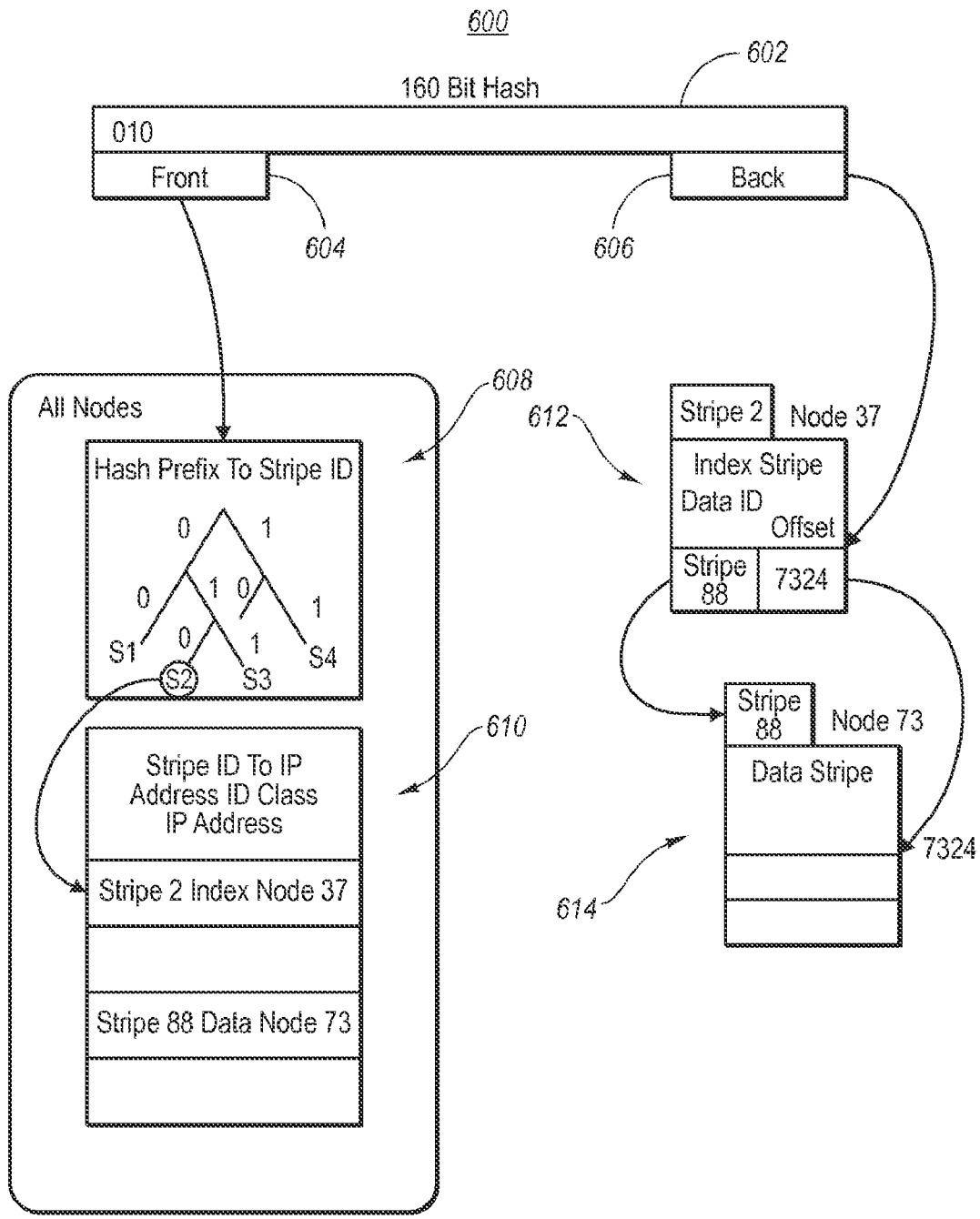
FIG. 6 is a simplified diagram illustrative of a hash file system address translation function for an example 160-bit hash value.

With reference additionally now to FIG. 6, a simplified diagram 600 is illustrative of a hash file system address translation function for an example 160-bit hash value 602. The hash value 602 includes a data structure comprising a front portion 604 and a back portion 606 as shown and the diagram 600 illustrates a particular "0 (1)" operation that is used (e.g., by the HFS server 140) for enabling the use of the hash value 602 to go to the location of the particular storage node in the system that contains the corresponding data.

The diagram 600 illustrates how the front portion 604 of the hash value 602 data structure may be used to indicate the hash prefix to stripe identification ("ID") 608 and how that is, in turn, utilized to map the stripe ID to IP address and the ID class to IP address 610. In this example, the "S2" indicates stripe 2 of index Node 37 612. The index stripe 612 of Node 37 then indicates stripe 88 of data Node 73 indicated by the reference numeral 614, and may also indicate a particular offset or object ID within stripe 88 of data Node 73.

In operation then, a portion of the hash value 602 itself may be used to indicate or steer the hash value being entered into the hash system to an index stripe which records a particular storage address (including data node and offset/object ID) for the corresponding data. In one embodiment, the selection of the particular storage address may be based at least in part on a portion of the probabilistically unique identifier. For instance, the back portion 606 may be used to determine offset or object ID information. Thus, one portion of the hash value can be used to indicate which node in the system contains the relevant data, another portion of the hash value 602 may be used to indicate which stripe of data at that particular node and yet another portion of the hash value 602 to indicate where within that stripe the data resides. Through this process, it can rapidly be determined if the data represented by the hash value 602 is already present in the system.

To restore client data backed up in a conventional HFS system, an HFS server starts with a root hash (or a hash pointing to a directory element to restore a single file, or the like). The HFS server can use the method described with respect to FIG. 6 to identify the corresponding index stripe that information about the root hash is recorded on. In this case, the HFS server has to do a seek on the index stripe to locate data node and offset/object ID information and then do a seek on the data node to retrieve the particular underlying data, which may be one or more atomics, composites, directory elements, or any combination thereof.

Each composite or directory element includes hash values pointing to other data. For each hash value included in a composite or directory element, the conventional HFS server can do a seek in a corresponding index stripe to determine a specific storage address for data pointed to by the hash value. Then the HFS server can do another seek in a corresponding data stripe to retrieve the appropriate data. Thus, at each level of a restore, a conventional HFS server performs numerous seeks in corresponding index stripes to determine specific storage addresses for data associated with hash values and then performs numerous seeks in corresponding data stripes to retrieve the associated data. The HFS server typically populates a cache with the composite/directory element data, hash values, storage addresses and data atomics in order to properly reconstruct client data before sending it to the client requesting the restore.

According to embodiments of the invention, however, the numerous seek operations performed by an HFS server to retrieve different data stored in different corresponding data stripes can be reduced by localizing storage of data near corresponding composites/directory elements. Additionally, the numerous seek operations performed by an HFS server to determine specific storage addresses recorded in different index stripes can be almost completely eliminated by recording storage addresses for data pointed to by hashes in a recipe with the recipe when the recipe is committed to the hash file system.

Figure 7:
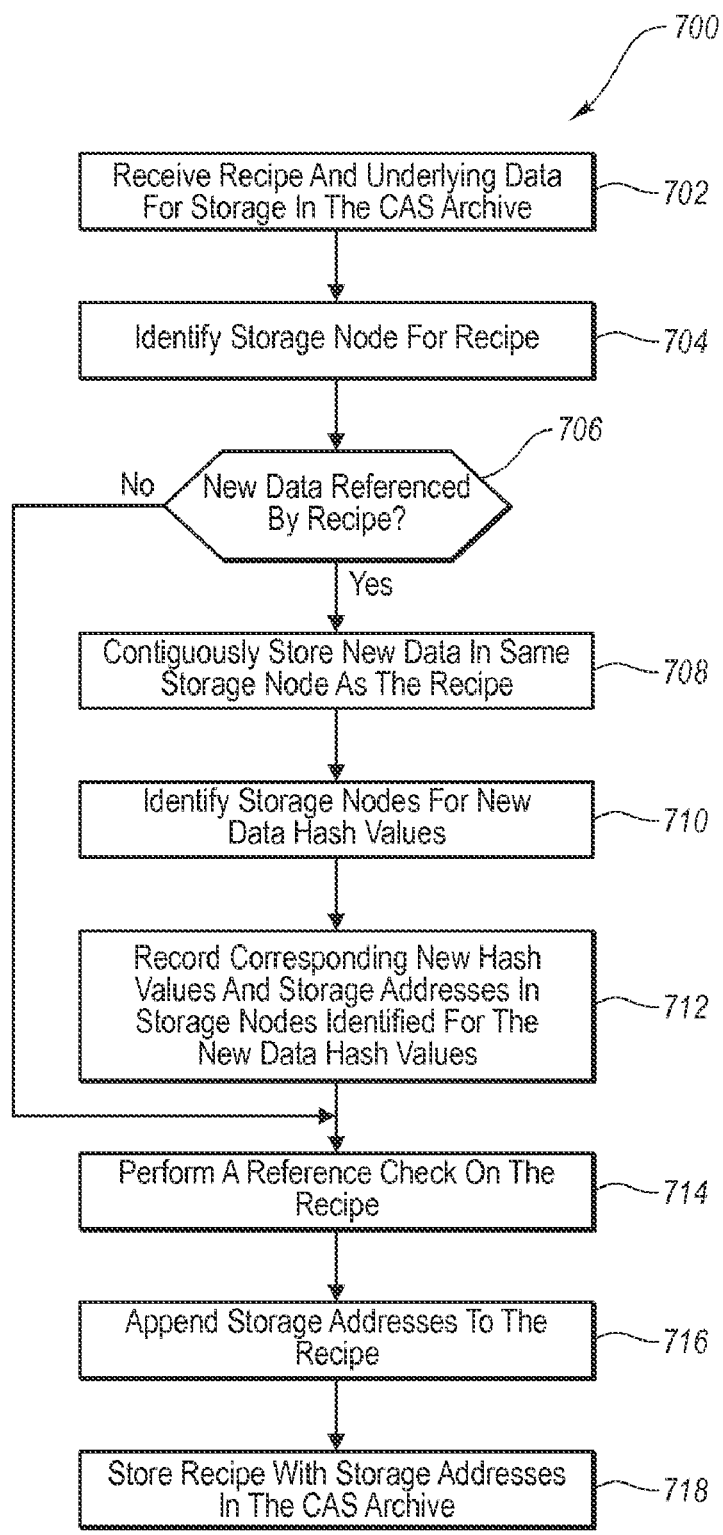
FIG. 7 depicts an example method for localizing storage of data with composite or directory element recipes and storing data addresses with the composite or directory element recipes to reduce seek operations during backup and restore processes.

With additional reference to FIG. 7, a method 700 is depicted for localizing storage of data near corresponding recipes and for storing data addresses with recipes entered into a hash file system during backup. The method 700 typically begins by an HFS server receiving 702 for storage in a CAS archive one or more new data pieces and a recipe for generating a data structure (e.g., a larger chunk of data, a file, or the like) from a plurality of underlying data pieces that include the one or more new data pieces.

The recipe may include hash values or other probabilistically unique identifiers corresponding to the plurality of underlying data pieces. The HFS server may additionally receive hash values corresponding to the recipe and/or to the one or more new data pieces. Alternately, the HFS server may receive 702 for storage in the CAS archive a recipe for generating a data structure from a plurality of underlying data pieces that do not include one or more new data pieces, in which case no new data pieces would be received with the recipe.

After receiving the recipe, the one or more new data pieces, and the corresponding hash values, the HFS server identifies 704 a first storage node for storage of the recipe. This may include analyzing a portion of the hash value derived from the recipe to steer the derived hash value to a particular index stripe using the method of FIG. 6 and selecting the storage node of the particular index stripe for storage of the recipe.

If the recipe references 706 only old data already stored in the CAS archive, the method 700 can proceed directly to step 714. This may be the case when the HFS server only receives 702 a recipe without also receiving one or more new data pieces and where the recipe only includes old hash values corresponding to old data already stored in the CAS archive.

If the recipe references 706 one or more new data pieces not stored in the CAS archive, the method continues by storing 708 the one or more new data pieces in the first storage node. For multiple new pieces, they can be stored contiguously in the first storage node such that they can all be retrieved in a single read.

Either before or after storing 708 the one or more new data pieces in the first storage node, the HFS server identifies 710 one or more other storage nodes for the one or more new hash values corresponding to the one or more new data pieces. This may include analyzing a portion of each hash value corresponding to a new data piece to steer the hash value to an index stripe using the method of FIG. 6.

Once one or more other storage nodes have been identified 710 for the one or more new hash values, the HFS server can record 712 the one or more corresponding new hash values and storage addresses in the appropriate storage node(s). For instance, the hash value for a new data piece and a storage location of the new data piece on the first storage node can be recorded in the index stripe of a second storage node.

Prior to entering the recipe into the CAS archive 144, the HFS server performs 714 a reference check on the underlying data pieces associated with the hash values included in the recipe. The reference check is performed to verify the existence of the underlying data and to prevent data corruption. Performing the reference check may include, for each hash value included in the recipe, looking up the hash value in a corresponding index stripe/storage node to determine a storage address for the associated data.

Alternately or additionally, it may be unnecessary to perform 714 a reference check on new data pieces referenced by the recipe as they may have been received and stored concurrently with the processing of the recipe, in which case the HFS server already knows they exist and where. Thus, when the recipe references only new data pieces without referencing any old data pieces, the step 714 of reference checking can be skipped altogether.

For new data pieces, the HFS server 140 already knows specific storage addresses of the new data pieces (as they were recorded by the HFS server with corresponding hash values in the other storage nodes in step 712). For old data pieces, the HFS server 140 can read the specific storage addresses for the associated data from the corresponding index stripes during the reference check. The specific storage addresses for all of the data associated with the hash values included in the recipe can then be appended 716 to the recipe. As will be explained more fully below, the inclusion of these storage addresses—also referred to as "location hints"—with the recipe virtually eliminates index seeks performed to identify storage addresses during a restore process.

Once the storage addresses have been appended to the recipe, the recipe can then be stored 718 in the previously identified first storage node of the CAS archive 144. Alternately or additionally, the recipe can be stored earlier in the method 700, such as immediately after identifying 704 the first storage node for the recipe. In this case, the storage addresses can be appended to the recipe in the first storage node after the recipe has already been stored.

Figure 8:
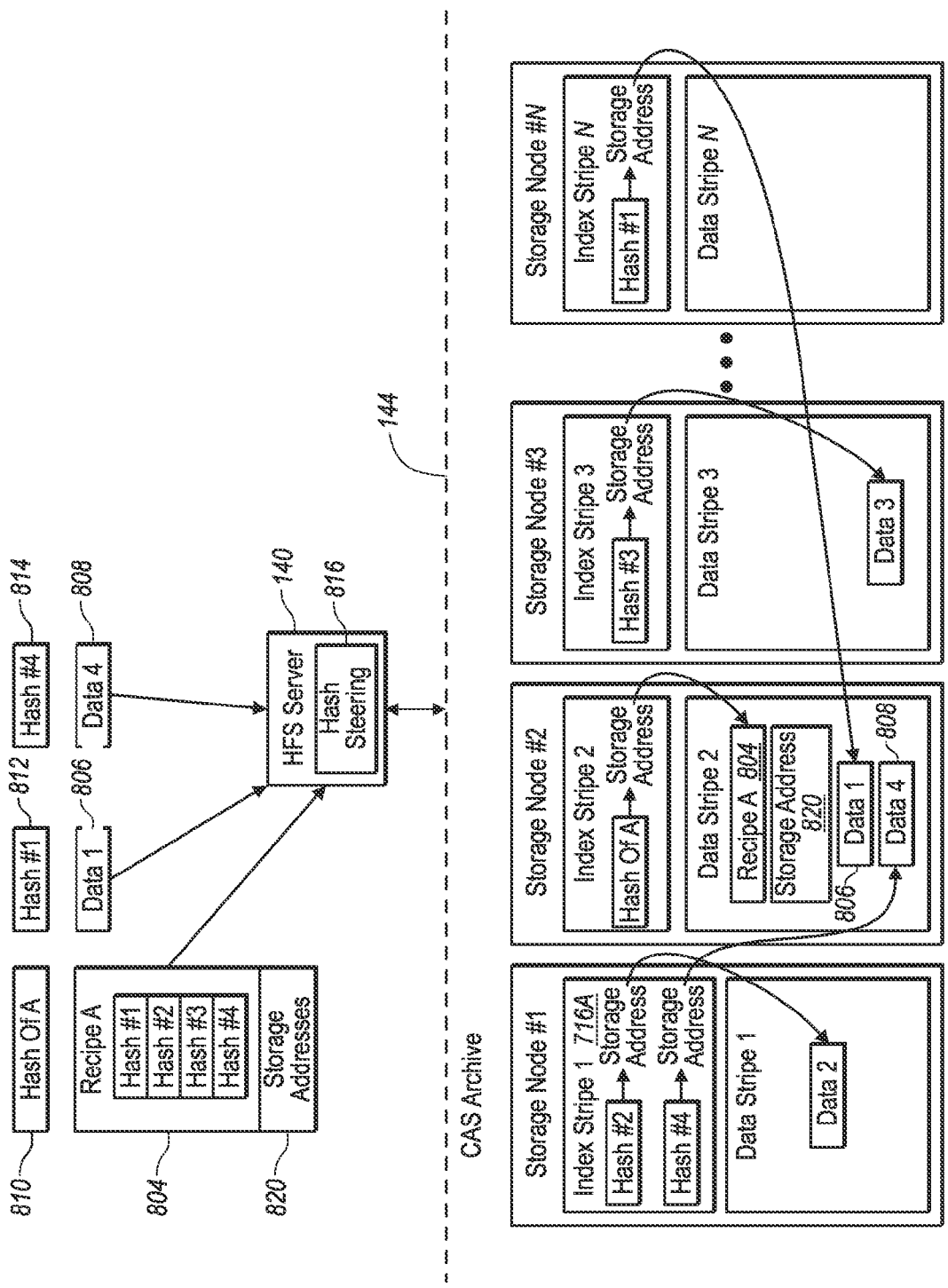
FIG. 8 conceptually illustrates the localized storage of data with composite or directory element recipes and appended storage addresses.

The localized storage of underlying data pieces and appending of storage addresses to a recipe is conceptually illustrated in FIG. 8. As shown, the HFS server 140 receives a recipe A, new data pieces 1 and 4, and hash values 810, 812, 814 corresponding to recipe A and new data pieces 1 and 4. A hash steering module 816 of the HFS server 140 steers the hash values to corresponding index stripes on storage nodes according to the methods described herein. The new data pieces 1 and 4 are contiguously stored in storage node #2, which is the same storage node in which recipe A is stored. After storing data pieces 1 and 4 in storage node #2, storage addresses for these data pieces can be recorded with the corresponding hash values (e.g., hash #1 and hash #4) in the index stripes of the storage nodes that hash #1 and hash #4 were steered to.

As shown, recipe A also references old data piece 2 and old data piece 3 with hash #2 and hash #3. The HFS server 140 can perform a reference check on these data pieces to verify their existence prior to entering the recipe A into the CAS system. During the reference check, the HFS server 140 identifies storage addresses for these data pieces. These storage addresses and the storage addresses of the new data pieces can be appended to recipe A as shown, and stored alongside recipe A in storage node #2.

In the embodiment of FIG. 8, recipe A references only atomic data. However, embodiments of the invention also include localizing the storage of composite or directory element data referenced by a recipe. In this case, a lower level composite can be localized to an upper level composite or directory element, while data referenced by the lower level composite can be localized to the lower level composite.

Advantageously, the localized storage of data with a recipe reduces the number of seeks required to restore the recipe. For instance, if all of the data pieces making up a recipe are stored contiguously near the recipe, the data pieces can be retrieved in a single seek rather than in multiple seeks. This is facilitated by including storage addresses of underlying data pieces with recipes.

Further, the inclusion of storage addresses with recipes can be accomplished while adding little or no processing overhead to the HFS server 140. In particular, the HFS server 140 performs reference checks when entering recipes into the CAS archive 144 to prevent data corruption, whether or not storage addresses are stored with recipes. Consequently, the HFS server has to read the storage addresses for the data associated with the hash values included in the recipe anyways, and these storage addresses can easily be appended to the recipe.

Additionally, the inclusion of storage addresses with recipes adds very little data to the CAS archive 144. For instance, in a typical CAS archive, recipes, including composites and directory elements, make up less than 2% of the stored data. The aggregate size of storage addresses stored alongside any given recipe is less than the size of the recipe itself. Consequently, the addition of storage addresses to a CAS archive typically amounts to less than 2% additional data. However, this less than 2% additional data can result in almost complete elimination of index seeks and up to 90% or higher reduction in data seeks (e.g., if a recipe references 10 data pieces and all are stored contiguously near the recipe, only 1 data seek is required to retrieve all 10 data pieces, instead of 10 separate seeks).

Figure 9:
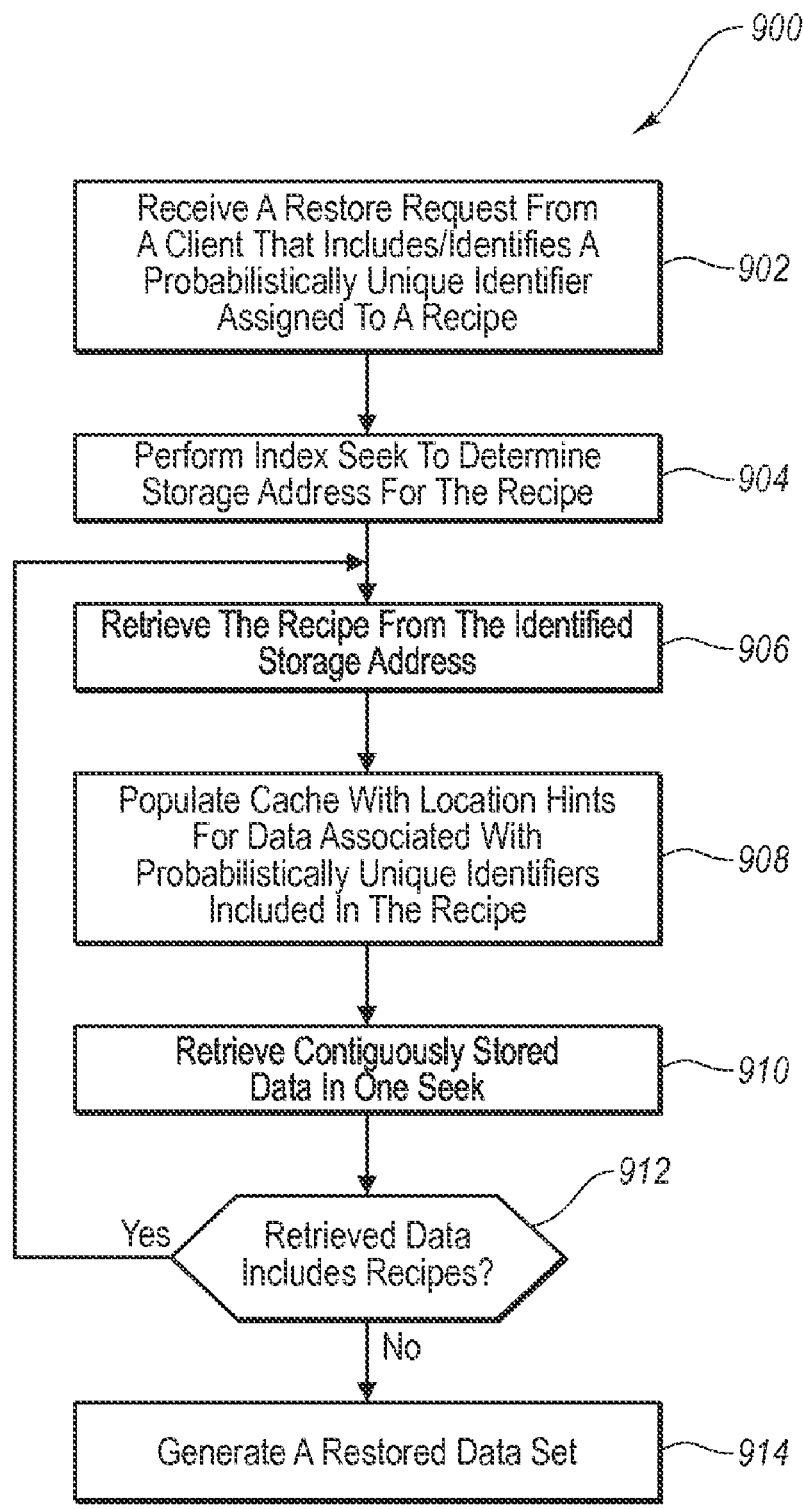
FIG. 9 depicts an example method for reducing seek operations during restore processes on a hash file system server.

With additional reference to FIG. 9, a method 900 is illustrated for reducing the number of seek operations performed by an HFS server 140 during a restore process to speed up the restore process. The method 900 typically begins by receiving 902 a restore request from a client 110 (or 120). The restore request may comprise a request for a backup from a particular date/time, in which case the HFS server 140 may use a user accounting system to identify and retrieve a hash value or other probabilistically unique identifier assigned to the data for which restore is requested. Alternately or additionally, the restore request received from the client 110 may include the hash value itself.

The hash value may comprise a top level root hash, or a hash value at any other level within the hash file system. For instance, the hash value may comprise a root hash assigned to a complete backup when the client is requesting the restore of all of the client data 116, or it may comprise a hash value assigned to a directory element when the client is requesting the restore of a single file, or the like.

Using the hash value, the HFS server 140 performs 904 an index seek on a corresponding index stripe to determine a storage address for an underlying recipe from which the probabilistically unique identifier is derived. As used herein, an "index seek" simply refers to a seek in an index stripe to identify a storage address for data associated with a hash value. Typically, the storage address identifies a storage node, a data stripe on the storage node, and an offset or object ID within the data stripe. Advantageously, the first index seek can be the only index seek required to restore backup data, no matter how many levels of atomics/recipes extend beneath the starting hash value of a given backup. In contrast, a conventional HFS server typically performs index seeks on every hash value at every layer of a given backup during a restore process.

Once a storage address for the recipe is identified, the HFS server 140 performs a data seek to retrieve 906 the recipe from the identified storage address. As used herein, a "data seek" simply refers to a seek into a storage node to retrieve data at a particular storage address of the storage node. Advantageously, the recipe includes appended location hints or storage addresses for data associated with the hash values included in the recipe. In this way, the HFS server 140 can populate 908 a cache 148 with the hash values included in the recipe and corresponding location hints or storage addresses without performing any additional index seeks.

The HFS server 140 can use the populated cache to retrieve 910 contiguously stored data (which can also populate the cache 148) in one data seek. Where all of the data referenced by the recipe is contiguously stored, it can all be retrieved 810 in one seek. Alternately or additionally, one or more data may be referenced by the recipe that are not contiguously stored, in which case more seeks may be required to retrieve all of the data.

If the retrieved data includes 912 one or more recipes, a portion of the method 900 may be repeated to retrieve 906 each recipe, populate 908 the cache 148 with hash values included in the recipe and location hints for associated data, and retrieve 910 contiguously stored data in one seek, and non-contiguously stored data in additional seeks. This cycle can be repeated through all the layers of a restore process until the retrieved data no longer includes 912 recipes. Finally, the HFS server 140 can generate 914 a restored data set from the retrieved data in the cache 148.

It will be appreciated by one of skill in the art, with the benefit of the present disclosure, that the methods 700 and 900 of FIGS. 7 and 9 can be combined in whole or in part to practice different embodiments of the invention. Further, the methods 700 and 900 may be modified to include additional or fewer steps than those illustrated and discussed above. For instance, step 716 of FIG. 7 (appending location hints to a recipe) may be included as part of step 718 (storing a recipe with location hints in the CAS archive). Alternately or additionally, performing 714 a reference check is not required in all embodiments as explained above. With respect to FIG. 9, for example, the method 900 for reducing seek operations during a restore process can begin at step 906 rather than at step 902.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired and wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system operable to back up and restore data, the system comprising:
 a high efficiency storage application configured to back up a chunk of data of a client system to a content addressed storage system by generating a recipe that includes instructions for generating the chunk of data from a plurality of data pieces; and
 a backup server communicably connected to the high efficiency storage application and configured to:
  store the recipe in a first storage node of the content addressed storage system based on a probabilistically unique identifier derived from the recipe;
  append storage addresses to the recipe in the first storage node, the appended storage addresses each identifying a location in the content addressed storage system where a corresponding data piece of the plurality of data pieces is stored; and
  in response to receipt of a restore request, recover the chunk of data by retrieving the recipe and the appended storage addresses in one index seek without separately looking up a storage address for any of the plurality of data pieces in an index.

2. The system of claim 1, wherein the high efficiency storage application is further configured to contiguously store two data pieces, not previously stored in the content addressed storage system, to the same storage node of the content addressed storage system as the recipe.

3. The system of claim 2, wherein the high efficiency storage application is further configured to retrieve the two contiguously stored data pieces in one seek.

4. The system of claim 1, wherein the backup server is further configured to verify the existence, in the content addressed storage system, of a data piece making up the chunk of data prior to appending a storage address of the data piece to the recipe in the first storage node.

5. The system of claim 1, wherein the backup server comprises a cache configured to be populated with the appended storage addresses in response to retrieval of the recipe and appended storage addresses.

6. The system of claim 1, wherein the probabilistically unique identifier comprises a hash value.

7. The system of claim 1, wherein the recipe includes probabilistically unique identifiers derived from the plurality of data pieces.

8. The system of claim 1, wherein the high efficiency storage application is integrated in the backup server.

9. The system of claim 1, wherein the high efficiency storage application is remote from the backup server.

10. The system of claim 9, wherein the high efficiency storage application is integrated in a remote client.

11. The system of claim 1, wherein the content addressed storage comprises a content addressed storage archive.

12. The system of claim 11, wherein the content addressed storage archive is integrated in the backup server.

13. The system of claim 11, wherein the content addressed storage archive is remote from the backup server.

* * * * *